United States Patent [19]

Crow

[11] 4,252,330
[45] Feb. 24, 1981

[54] SYMMETRICAL SEAL FOR A ROLLING CONE CUTTER EARTH BORING BIT

[75] Inventor: Morgan L. Crow, Dallas, Tex.

[73] Assignee: Dresser Industries, Inc., Dallas, Tex.

[21] Appl. No.: 72,495

[22] Filed: Sep. 4, 1979

[51] Int. Cl.³ .................... F16J 15/34; F16C 33/76
[52] U.S. Cl. ........................................ 277/92; 308/8.2
[58] Field of Search ............... 305/11; 277/88, 90, 277/91, 137, 198, 92; 308/8.2

[56] References Cited

U.S. PATENT DOCUMENTS

| Re. 28,105 | 8/1974 | Traub . | |
|---|---|---|---|
| 3,151,691 | 10/1964 | Goodwin . | |
| 3,330,568 | 7/1967 | Wetzel | 277/198 |
| 3,397,928 | 8/1968 | Galle | 277/92 |
| 3,449,024 | 6/1969 | Lichte . | |
| 3,467,448 | 9/1969 | Galle . | |
| 3,529,840 | 9/1970 | Durham et al. . | |
| 3,574,419 | 4/1971 | Hatch | 305/11 |
| 3,604,523 | 9/1971 | Lichte . | |
| 3,656,764 | 4/1972 | Robinson . | |
| 3,761,145 | 9/1973 | Schumacher . | |
| 3,862,762 | 1/1975 | Millsap | 277/92 |
| 3,930,657 | 1/1976 | Svensson et al. . | |

Primary Examiner—Robert I. Smith
Attorney, Agent, or Firm—Fred A. Winans; Eddie E. Scott

[57] ABSTRACT

An improved assembly seal acts as a barrier to the drilling fluid, pulverized cuttings and other materials in a borehole preventing the materials from entering the bearing area of a rolling cone cutter earth boring bit and retaining lubricant within the bearing area. The rolling cone cutter is rotatably mounted on a cantilevered bearing pin extending from the body of the bit. A symmetrical seal assembly is positioned between the cutter and bearing pin. The seal assembly is the same on both ends and can rotate against either the rotating cutter or stationary bearing pin. The seal assembly provides a metal-to-metal seal which is resistant to entry of abrasives and also provides a rubber-to-metal seal that provides an initial positive seal for filling and testing. The seal assembly includes a first annular rigid ring and a matching second annular rigid ring positioned between said bearing pin and said rolling cone cutter. An annular rubber ring with an extended lip on each end is located between the matching metal seal rings.

6 Claims, 5 Drawing Figures

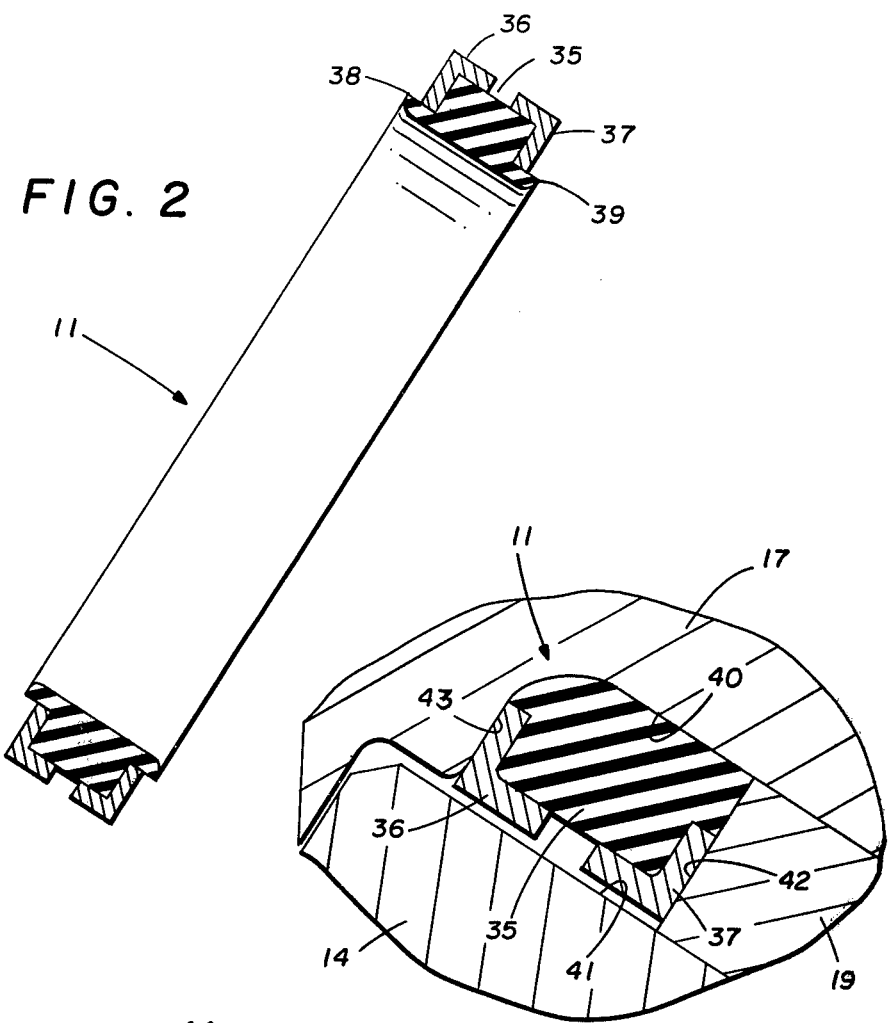

SYMMETRICAL SEAL FOR A ROLLING CONE CUTTER EARTH BORING BIT

BACKGROUND OF THE INVENTION

The present invention relates to the art of rolling cone cutter earth boring bits and, more particularly, to a rolling cone cutter earth boring bit with improved means for sealing the bearings of the bit from the abrasive materials in the borehole and retaining lubricant within the bearing area.

A rolling cone cutter earth boring bit includes a main bit body adapted to be connected to a rotary drill string. The bit includes rotatable cone cutters mounted on individual bearing pins extending from the main bit body. Bearing systems are provided between the cone cutters and the bearing pins to promote rotation of the cutters and means are provided on the outer surface of the cone cutters for disintegrating the earth formations as the bit and the cutters rotate. A sufficient supply of uncontaminated lubricant must be maintained proximate the bearing systems throughout the lifetime of the bit. Various forms of seals have been provided between the cone cutters and the bearing pins upon which they are mounted to retain lubricant and prevent contamination; however, the need for new sealing systems is as acute today as any time in the history of rock drilling.

A rolling cone cutter earth boring bit must operate under very severe conditions, and the size and geometry of the bit is restricted by the operating characteristics. At the same time, a longer lifetime and improved performance is needed from the bit. In attempting to provide an improved bit, new and improved materials have been developed for the cutting structure of the cone cutters. This has provided a longer useful lifetime for the cone cutters and resulted in the bearing systems of the bit being often the first to fail during the drilling operation. Consequently, a need exists for new and improved bearing systems to extend the useful lifetime of the bit and to allow development of other elements that interact with the sealing and bearing systems. In attempting to improve the bearing systems, new and improved sealing systems are needed to maintain the bearing area free of harmful materials and retain lubricant within the bearing area. In attempting to provide such new sealing systems, great care must be taken that the overall capacity of the bearing systems is not reduced.

DESCRIPTION OF PRIOR ART

In U.S. Pat. No. 3,761,145 to Percy W. Schumacher, Jr., patented Sept. 25, 1973, a drill bit seal means is shown. A drill bit including a roller cutter mounted on a greased bearing journal having a grease seal ring therearound and resilient means mounted between the seal ring and bearing journal to urge the seal ring against a sealing surface on the cutter in such a manner that the seal ring may be forced away from the cutter surface by some predetermined pressure from within the cutter but wherein the seal ring arrangement provides a substantially positive seal from pressures externally of the cutter to prevent detritus or other foreign material from entering into the bearing area interiorly of the drill bit cutter is provided. Elastomeric material may be provided between the seal ring and the cutter sealing surface.

In U.S. Pat. No. 3,656,764 to William P. Robinson, patented Apr. 18, 1972, a seal assembly for a drill bit is shown. An earth boring drill bit employing roller cutters is provided with an improved seal for inhibiting ingress of abrasive materials into the bearing surfaces and egress of lubricant. The improved seal is between an outwardly facing re-entrant corner on the journal and an inwardly facing re-entrant corner on the cutter. The seal is made by a pair of O-rings engaging the opposed re-entrant corners and separated by a floating rigid ring having opposed bearing surfaces for seating the O-rings into the corners. This seal accommodates radial, axial and angular displacements of almost twice the magnitude that can be accommodated by a single O-ring of the size of one of the O-rings without significantly increasing the length of journal needed for the seal.

In U.S. Pat. No. 3,467,448 to E. M. Galle, patented Sept. 16, 1969, a seal assembly for a drill bit bearing is shown. A seal means that has an annular body with a rigid and circumferentially continuous portion supported upon a resilient core which is sealingly fixed to a bearing element directly or through a retainer ring. The rigid portion engages and compresses a resilient packing ring against an opposed surface to effect a fluid seal.

Other drill bit sealing systems are shown in U.S. Pat. No. 1,884,965 to Baggett, U.S. Pat. No. 2,797,067 to Fisher, U.S. Pat. No. 3,075,781 to Atkinson, U.S. Pat. No. 3,096,835 to Neilson, U.S. Pat. No. 3,151,691 to Goodwin, U.S. Pat. No. 3,303,898 to Bercaru, U.S. Pat. No. 3,529,840 to Durham, U.S. Pat. No. 3,862,762 to Millsap and U.S. Pat. No. 3,397,928 to Galle.

SUMMARY OF THE INVENTION

The present invention provides an improved seal assembly for a rotary rock bit that acts as a barrier to the drilling fluid, pulverized cuttings and other materials in the borehole to prevent the materials from entering the bearing area of the bit to retain lubricant within the bearing area. A bearing pin extends from the body of the bit. A rolling cone cutter is rotatably mounted on the bearing pin. Bearing means are located between the rolling cone cutter and the bearing pin. The rolling cone cutter has a cutter mouth. The improved seal assembly is positioned around the bearing pin within the cutter mouth and located between the bearing pin and the rolling cone cutter. The seal assembly includes a symmetrical rubber seal ring with an extended lip on each end and matching metal seal rings, one on each end to provide a metal-to-metal seal and protect against damage by excessive entry of abrasives. The seal assembly can rotate against either the rotating cutter or the stationary bearing pin and provides a metal-to-metal seal which is resistant to entry of abrasives and also provides a rubber-to-metal seal to gain an initial bubble-tight seal for filling and test purposes. The above and other features and advantages of the present invention will become apparent upon consideration of the following detailed description of the invention when taken in conjunction with the accompanying drawings.

BRIEF DESCRIPTION OF THE DRAWINGS

FIG. 2 is an enlarged view of the seal assembly of the bit shown in FIG. 1.

FIG. 3 is an enlarged cross-sectional view of the seal assembly in position between the cutter and bearing pin.

FIG. 5 is a schematic representation of the seal assembly of the bit shown in FIG. 4.

DETAILED DESCRIPTION OF THE INVENTION

Figure 1:
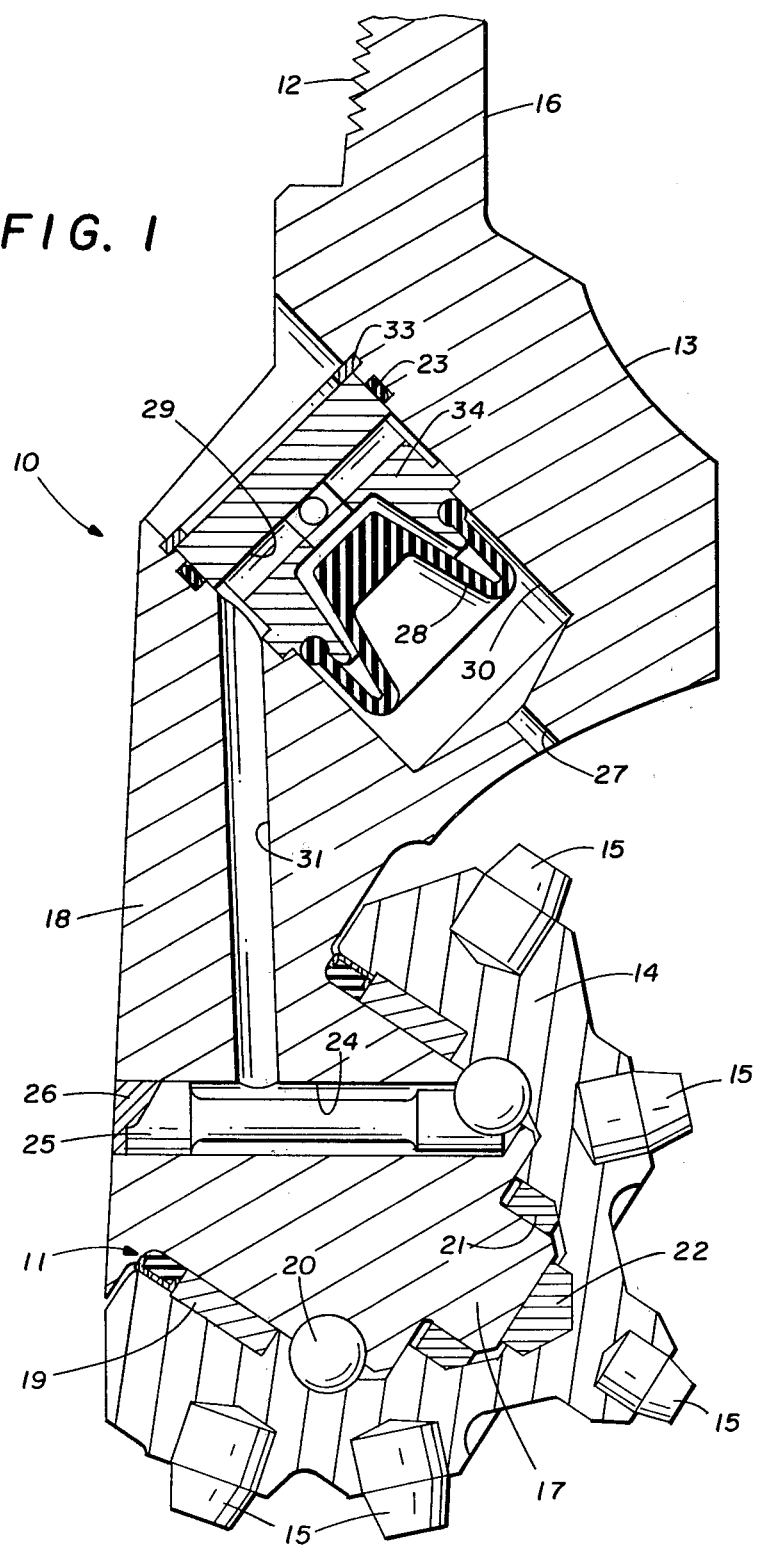
FIG. 1 is an illustration of an earth boring bit constructed in accordance with the present invention.

Referring now to FIG. 1, a sectional view of one arm 18 of a three-cone rotary rock bit 10 is shown. It is to be understood that the structure of the other two arms are substantially identical to the arm 18. A cutter 14 is rotatably positioned on the journal portion or bearing pin 17 of the arm 18 and adapted to disintegrate the earth formations as the bit 10 is rotated. The bearing pin 17 projects from the cutter receiving surface of the arm 18. The cutting structure 15 on the surface of cutter 14 contacts and disintegrates the formations in a manner that is well known in the art. The cutting structure 15 is shown in the form of tungsten carbide inserts. However, it is to be understood that other cutting structures such as steel teeth may be used as the cutting structure on the cone cutter 14.

The body 13 of the bit 10 includes an upper threaded portion 12 that allows the bit 10 to be connected to the lower end of a rotary drill string (not shown). The bit 10 also includes a central passageway 16 extending along the central axis of the bit to allow drilling fluid to enter from the upper section of the drill string (not shown) immediately above and pass downward to the bottom of the well bore to flush cuttings and drilling debris from the well bore.

A plurality of bearing systems are located in the bearing area between the cutter 14 and the bearing pin 17. The bearing systems in the bearing area include an outer friction bearing 19, a series of ball bearings 20, an inner friction bearing 21, and a thrust button 22. A seal assembly generally designated by the reference number 11 is positioned between the cutter 14 and the bearing pin 17. The seal assembly acts to retain lubricant in the bearing area around the bearing systems and prevent any materials in the well bore from entering the bearing area. The details of the seal assembly 11 will be explained subsequently. Passageways are provided to allow lubricant to be transmitted to the bearing systems. The passageway 24, as shown, also allows the balls that make up the ball bearing system 20 to be inserted into position after the cone cutter 14 is placed on the bearing pin 18. The series of ball bearings 20 serves to lock the cone cutter 14 on bearing pin 18. After the balls are in place, a plug 25 is inserted into the passageway 24 and welded therein by weld 26. Plug 25 has a reduced diameter throughout the major portion of its length to allow lubricant to be transmitted to the bearing area.

A bore 30 extends into the bit body 13 from the surface of the bit body. A passage 31 extends from the bore 30 to the passageway 24. A lubricant reservoir is located in the bore 30. The lubricant reservoir is located between a flexible diaphragm 28 and a reservoir cap 34. An O-ring seal 23 prevents borehole fluid from by-passing the upper portion of the reservoir cap 34 and lubricant within the lubricant reservoir from escaping into the borehole. A retaining ring 33 holds reservoir cap 34 in position in bore 30. The flexible diaphragm 28 prevents lubricant in the lubricant reservoir from escaping into the bore 30 and fluid in the borehole that has entered bore 30 through passage 27 from entering the lubricant reservoir. Lubricant within the lubricant reservoir is channeled into the passage 31 through opening 29 and is directed to the bearings.

Referring now to FIG. 2, an enlarged view of the seal assembly 11 is shown. The seal assembly 11 is positioned between the bearing pin 17 and rolling cone cutter 14. The seal assembly 11 provides a bearing seal that will work in the presence of abrasives and oil well drilling mud to effectively seal a rock bit or other drilling tool bearing. The seal assembly 11 is a symmetrical seal assembly which is the same on both ends and can rotate against either face; that is, against the rotating element, or against the stationary element and provides a metal-to-metal seal which is resistant to entry of abrasives and also provides a rubber-to-metal seal to gain an initial bubble-tight seal for filling and test purposes. The symmetrical seal assembly includes a rubber seal ring 35 with an extended lip (38 and 39) on each end and matching metal seal rings 36 and 37, one on each end to provide a metal-to-metal seal and protect against damage by excessive entry of abrasives.

Referring now to FIG. 3, the seal assembly 11 is positioned between surface 40 on the bearing pin 17 and a surface 41 on the cone cutter 14. The seal assembly 11 is also positioned between the cutter surface 42 and the bearing pin surface 43. The seal assembly 11 includes the metal rings 36 and 37 or rings of some other similarly rigid material. The metal rings 36 and 37 are bonded to or encased in the elastomer ring 35. The seal assembly 11 acts as a static seal due to the press-fit or interference fit compressing the elastomer 35 between the inside surface 42 of the cone cutter and the surface 43 on the bearing pin 17.

The structural details of an earth boring bit 10 constructed in accordance with the present invention having been described, the operation of the bit 10 will now be considered with reference to FIGS. 1–3. The lubrication system of the bit 10 is filled with a suitable lubricant. The bit is rotated and thrust downward, thrusting the cutter 14 against the earth formations. Continued rotation with the drill string applying a thrust force to the bit 10 causes the cutters to disintegrate the formations and form the desired borehole. The present invention provides seal assembly 11 in the cone mouth of the cutter 14 that will act as a barrier to the pulverized cuttings, the borehole fluid and any other materials in the borehole. The seal assembly 11 acts to prevent these materials from entering the bearing area through the cone mouth opening, thus providing an uncontaminated environment for the metal bearing elements and eliminating the abrasive wearing action of foreign materials in the bearing area. The lubricant is retained within the bit 10 by the seal assembly 11 to assure a long lifetime for the bearing systems. The seal assembly 11 is the same on both ends and can rotate against either face; that is, the rotating element 14, or against the stationary element 17 and provides a metal-to-metal seal which is resistant to entry of abrasives and also provides a rubber-to-metal seal to gain an initial bubble-tight seal for filling and testing purposes.

Figure 4:
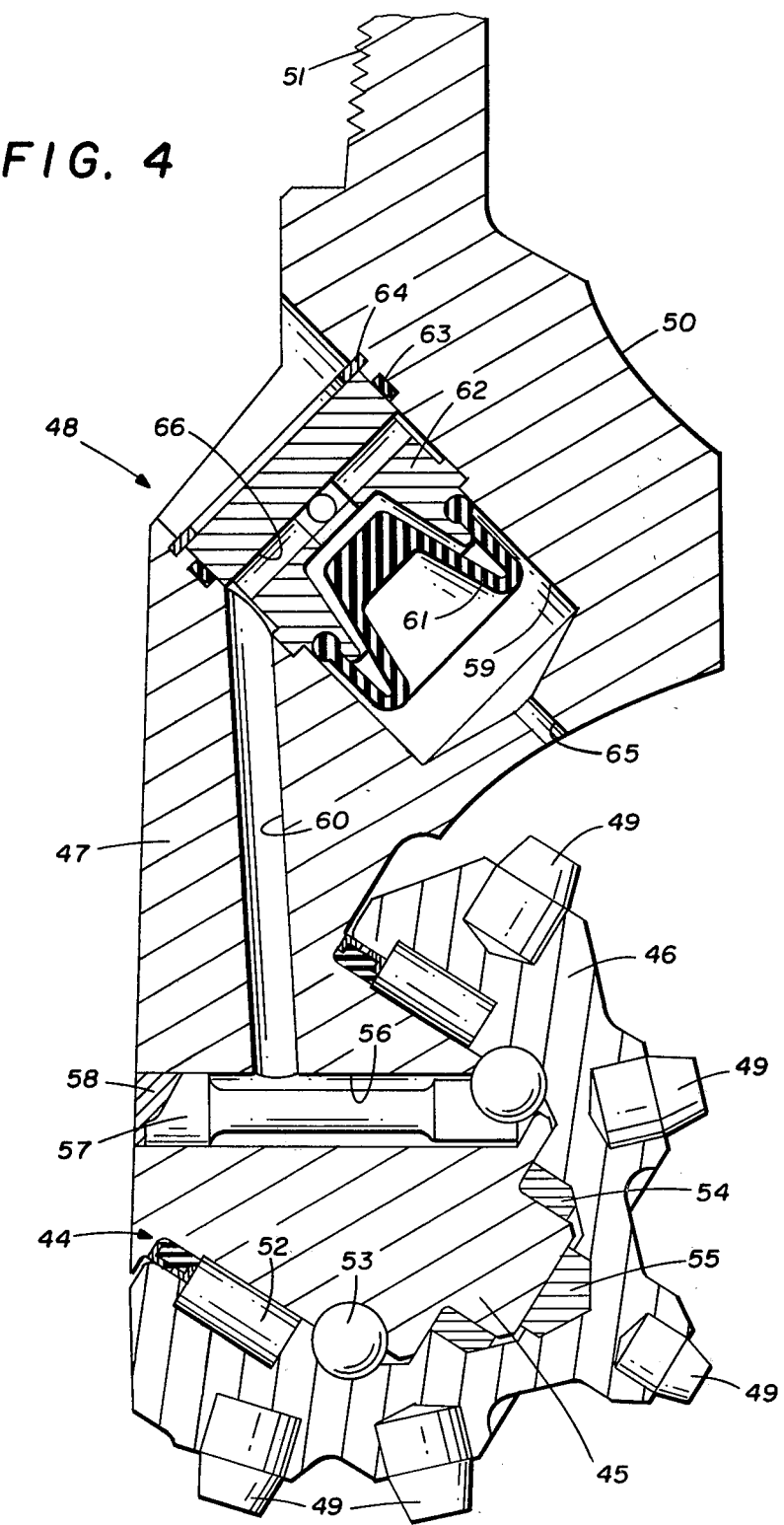
FIG. 4 illustrates another embodiment of the present invention.

Referring now to FIG. 4, another embodiment of a seal assembly constructed in accordance with the present invention is shown. The seal assembly 44 is positioned between a surface on the bearing pin 45 and a surface on the cone cutter 46. The cutter 45 is rotatably positioned on the journal portion or bearing pin 45 of the arm 47 and adapted to disintegrate the earth formations as the bit 48 is rotated. The bearing pin 45 projects from the cutter receiving surface of the arm 47. The cutting structure 49 on the surface of cutter 46 contacts and disintegrates the formations in a manner that is well known in the art. The cutting structure 49 is shown in the form of tungsten carbide inserts. However, it is to be understood that other cutting structures such as steel teeth may be used as the cutting structure on the cone cutter 46.

The body 50 of the bit 48 includes an upper threaded portion 51 that allows the bit 48 to be connected to the lower end of a rotary drill string (not shown). The bit 48 also includes a central passageway extending along the central axis of the bit to allow drilling fluid to enter from the upper section of the drill string (not shown) immediately above and pass downward to the bottom of the well bore to flush cuttings and drilling debris from the well bore.

A plurality of bearing systems are located in the bearing area between the cutter 46 and the bearing pin 45. The bearing systems in the bearing area include roller bearings 52, a series of ball bearings 53, an inner friction bearing 54, and a thrust button 55. The seal assembly generally designated by the reference number 44 is positioned between the cutter 46 and the bearing pin 45. The seal assembly acts to retain lubricant in the bearing area around the bearing systems and prevents any materials in the well bore from entering the bearing area. Passageways are provided to allow lubricant to be transmitted to the bearing systems. The passageway 56, as shown, also allows the balls that make up the ball bearing system 53 to be inserted into position after the cone cutter 46 is placed on the bearing pin 45. The series of ball bearings 53 serves to lock the cone cutter 46 on bearing pin 45. After the balls are in place, a plug 57 is inserted into the passageway 53 and welded therein by weld 58. Plug 57 has a reduced diameter throughout the major portion of its length to allow lubricant to be transmitted to the bearing area.

A bore 59 extends into the body 50 from the surface of the bit body. A passage 60 extends from the bore 59 to the passageway 56. A lubricant reservoir is located in the bore 59. The lubricant reservoir is located between a flexible diaphragm 61 and a reservoir cap 62. An O-ring seal 63 prevents borehole fluid from by-passing the upper portion of the reservoir cap 62 and lubricant within the lubricant reservoir from escaping into the borehole. A retaining ring 64 holds reservoir cap 62 in position in bore 59. The flexible diaphragm 61 prevents lubricant in the lubricant reservoir from escaping into the bore 59 and fluid in the borehole that has entered bore 59 through passage 65 from entering the lubricant reservoir. Lubricant within the lubricant reservoir is channeled into the passage 60 through opening 66 and is directed to the bearings.

Referring now to FIG. 5, an enlarged illustration of the seal assembly 44 is provided. The seal assembly 44 is positioned between the bearing pin 45 and rolling cone cutter 46. The seal assembly 44 provides a bearing seal that will work in the presence of abrasives and oil well drilling mud to effectively seal a rock bit or other drilling tool bearing. The seal assembly 44 is a symmetrical seal assembly that is the same on both ends and can rotate against either face; that is, in the rotating element, or against the stationary element and provides a metal-to-metal seal which is resistant to entry of abrasives and also provides a rubber-to-metal seal to gain an initial bubble-tight seal for filling and testing purposes. The symmetrical seal assembly includes a rubber seal ring 67 with extended lips 68 and 69 on each end and identical metal seal rings 70 and 71, one on each end to provide a metal-to-metal seal and protect against damage by excessive entry of abrasives. The seal assembly 44 is positioned between surface 72 on the bearing pin and a surface 73 on the cone cutter. The seal assembly 44 is also positioned between the cutter surface 75 and the bearing pin surface 74. The seal assembly 44 includes the metal rings 70 and 71 or rings of some other similarly rigid material. The metal rings 70 and 71 are bonded to or encased in the elastomer ring 67. The seal assembly 44 acts as a static seal due to the press-fit or interference fit compressing the elastomer 67 between the inside surface 75 of the cone cutter and the surface 74 on the bearing pin.

The structural details of another embodiment of an earth boring bit 48 constructed in accordance with the present invention having been described, the operation of the bit 48 will now be considered with reference to FIGS. 4 and 5. The lubrication system of the bit 48 is filled with a suitable lubricant. The bit is rotated and thrust downward, thrusting the cutter 46 against the earth formations. Continued rotation with the drill string applying a thrust force to the bit 48 causes the cutters to disintegrate the formations and form the desired borehole. The present invention provides seal assembly 44 in the cone mouth of the cutter 46 that will act as a barrier to the pulverized cuttings, the borehole fluid and any other materials in the borehole. The seal assembly 44 acts to prevent these materials from entering the bearing area through the cone mouth opening, thus providing an uncontaminated environment for the metal bearing elements and eliminating the abrasive wearing action of foreign materials in the bearing area. The lubricant is retained within the bit 48 by the seal assembly 44 to assure a long lifetime for the bearing systems. The seal assembly 44 is the same on both ends and can rotate against either face; that is, the rotating element 46, or against the stationary element 45 and provides a metal-to-metal seal that is resistant to entry of abrasives and also provides a rubber-to-metal seal to gain an initial bubble-tight seal for filling and testing purposes.

The embodiments of the invention in which an exclusive property or privilege is claimed are defined as follows:

1. In an earth boring bit having a bit body, a bearing pin extending from said bit body and a rolling cone cutter mounted to rotate on said bearing pin, the improvement comprising:
 an annular seal assembly disposed between said rolling cone cutter and said bearing pin and including:
 a first annular substantially rigid ring positioned around said bearing pin and defining a radially extending sealing surface,
 a second annular substantially rigid ring positioned around said bearing pin and defining an opposed facing radially extending sealing surface,
 an elastomer ring attached to and positioned concentrically between said first and second annular substantially rigid rings and axially resiliently separating said rings and wherein the elastomeric ring has an annular lip on each opposed radial surface radially inwardly of said sealing surface and extending axially beyond said sealing surface,
 whereby said elastomeric ring urges said first and second annular rigid rings respectively into sealing contact with said bearing pin and rolling cone cutter as said cutter rotates about said bearing pin and said lips also sealingly engage said bearing pin and cutter respectively interiorly thereof.

2. Structure according to claim 1 wherein said first and second rigid rings are substantially identical and with each comprising:
an axially extending outer annular portion terminating in a radially inwardly extending portion defining said sealing surface;
and said elastomeric ring defines:
an axially extending outer surface having a radially outwardly projecting mid-portion and wherein,
said rigid rings are disposed on axially opposite sides of said mid-portion with said axially extending portion of each ring extending toward the like portion of the other.

3. Structure according to claim 2 wherein each rigid ring as disposed on said elastomeric ring is a mirror image of the other whereby said seal assembly is symmetrical and reversible.

4. In an earth boring bit having a bit body, a bearing pin extending from said bit body and a rolling cone cutter mounted to rotate around said bearing pin, the improvement comprising:
an annular seal assembly disposed between said rolling cone cutter and said bearing pin and including:
a first annular substantially rigid ring member having a radially extending sealing surface in facing engagement with said bearing pin,
a second annular substantially rigid ring member having a radially extending sealing surface in facing engagement with said rolling cone cutter; and,
an elastomeric ring attached to and positioned concentrically between said first and second annular substantially rigid ring members and axially resiliently separating said members and wherein the elastomeric ring has an inner surface radially inward of said rigid ring members and extending axially beyond the sealing surface of said rigid ring members thereby forming a seal assembly that can rotate against said bearing pin or rolling cone cutter, said first and second annular rigid ring members and elastomeric ring cooperating when said rolling cone cutter is mounted on said bearing pin to resiliently urge the sealing surface of said first and second annular rigid rings respectively into sealing contact with said bearing pin and rolling cone cutter and said extending lips compressed into sealing engagement internally of said sealing surfaces of said rigid members.

5. Structure according to claim 4 wherein said first and second rigid rings are substantially identical and with each comprising:
an axially extending outer annular portion terminating in a radially inwardly extending portion defining said sealing surface;
and said elastomeric ring defines:
an axially extending outer surface having a radially outwardly projecting mid-portion and wherein,
said rigid rings are disposed on axially opposite sides of said mid-portion with said axially extending portion of each ring extending toward the like portion of the other.

6. Structure according to claim 5 wherein each rigid ring as disposed on said elastomeric ring is a mirror image of the other wherein said seal assembly is symmetrical and reversible.

* * * * *